United States Patent

Buff, Jr.

[11] 3,874,548
[45] Apr. 1, 1975

[54] BAKING UTENSIL
[76] Inventor: George J. Buff, Jr., Kresson Rd., Cherry Hill, N.J. 08034
[22] Filed: Sept. 27, 1972
[21] Appl. No.: 292,730

[52] U.S. Cl. ............ 220/21, 206/484, 220/16, 220/74, 229/3.5 MF
[51] Int. Cl. .............. B65d 57/00, B65d 85/00
[58] Field of Search ........... 220/20, 21, 16, 17, 74; 229/3.5 MF; 206/484

[56] References Cited
UNITED STATES PATENTS

| | | | |
|---|---|---|---|
| 1,541,799 | 6/1925 | Dodge | 220/16 |
| 2,182,454 | 12/1939 | Sherman | 220/21 |
| 3,643,812 | 2/1972 | Mander et al. | 220/21 |
| 3,741,427 | 6/1973 | Doyle | 229/3.5 MF |

FOREIGN PATENTS OR APPLICATIONS

| | | | |
|---|---|---|---|
| 1,371,684 | 10/1963 | France | 220/17 |
| 468,180 | 6/1937 | United Kingdom | 220/21 |
| 474,426 | 8/1969 | Switzerland | 220/21 |

Primary Examiner—William I. Price
Assistant Examiner—Joseph M. Moy
Attorney, Agent, or Firm—Robert K. Youtie

[57] ABSTRACT

A baking utensil including outer and inner parts of relatively thin metal, the outer part being thicker than the inner part, and the inner part being formed with a plurality of receptacles for articles being individually baked.

6 Claims, 3 Drawing Figures

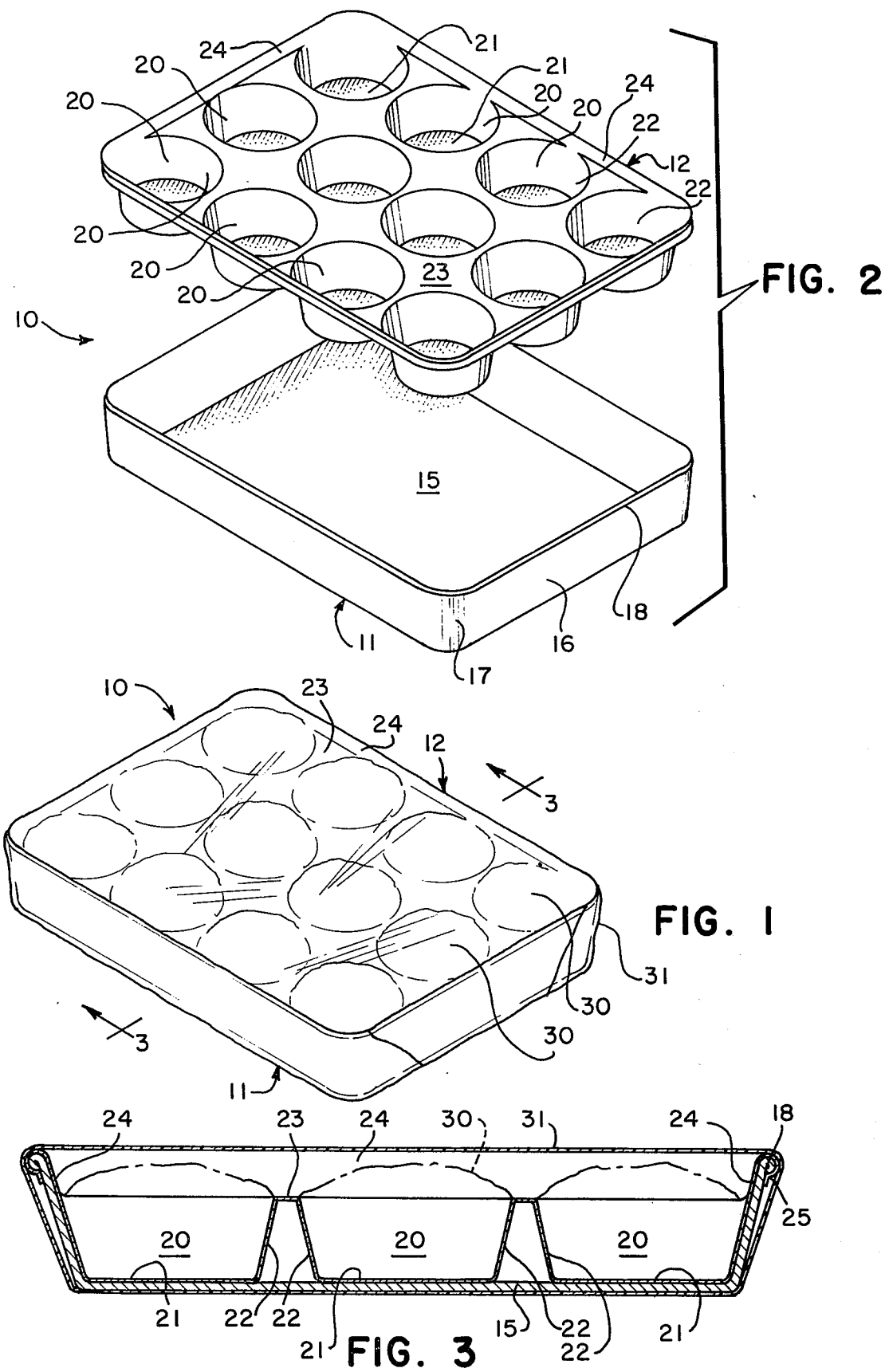

BAKING UTENSIL

BACKGROUND OF THE INVENTION

While the instant baking utensil has been primarily developed and employed for use in commercial baking operations, and will be illustrated and described hereinafter with particular reference thereto, it is appreciated that the device is capable of many varied applications, all of which are intended to be comprehended herein.

Heretofore, in commercial baking procedures, it was considered necessary to employ relatively heavy baking utensils for individual muffins, rolls, and the like, such as the type including a generally flat metal sheet or plate having a plurality of holes, and a plurality of relatively heavy metal cups having their upper edges secured in the respective holes. Such utensils are quite expensive, sufficiently so that economy requires repeated reuse of the utensils. Thus, in the prior art the baked or partially baked goods were necessarily removed or dumped from the baking utensils for subsequent container filling or packaging operations prior to distribution.

SUMMARY OF THE INVENTION

It is, therefore, an important object of the present invention to provide a unique baking utensil which effects substantial economies in commercial baking operations by eliminating the dumping or removal of baked goods from the baking containers, and greatly simplifying the wrapping procedure for distribution.

It is another object of the present invention to provide a baking utensil having the advantageous characteristics mentioned in the preceding paragraph for use with individual, detached rolls, muffins, or the like, without appreciable added expense relative to the heretofore cheaper attached rolls.

It is a more particular object of the present invention to provide a baking utensil of the type described which is sufficiently inexpensive to serve both as a container for the goods in baking and in distribution to the ultimate purchaser, permitting of convenient "brown and serve" by the ultimate purchaser in the utensil and providing an extremely attractive package exposing to view all of the contents at the point of sale, while affording ample protection to the contents throughout the baking operation, and handling in storage, transit and distribution.

It is a further object of the present invention to provide a two-part baking utensil of the type described wherein a substantial quantity of outer parts are highly nestable, one within the other, as are a substantial quantity of inner parts highly nestable within each other, to effect substantial economies in space for transportation and storage prior to assembly, which may be quickly and easily achieved at the baking location by simple operations which may be automated, if desired. Further, a variety of different inner utensil parts may be selectively employed conjointly with a single outer utensil part to achieve high versatility in production and packaging with a minimum of inventory and investment in dies and materials.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a top perspective view showing a finished package for sale to the ultimate purchaser including a baking utensil constructed in accordance with the teachings of the present invention.

FIG. 2 is a top perspective view showing the component part of the instant baking utensil in exploded condition.

FIG. 3 is a sectional elevational view taken generally along the line 3—3 of FIG. 1.

DESCRIPTION OF THE PREFERRED EMBODIMENT

Referring now more particularly to the drawings, and specifically to FIG. 2 thereof, the baking utensil is there generally designated 10, and includes a lower or outer part 11, and an upper or inner part 12. Each of the outer and inner parts 11 and 12 is advantageously integrally fabricated of a single sheet of metal, such as aluminum foil, say by suitable blanking and forming processes. In accordance with the instant invention, the outer part 11 is fabricated of a heavier gauge sheet metal, say approximately 0.003 inches or heavier, while the inner part 12 is advantageously fabricated of a lighter gauge, approximately 0.002 inches or lighter. In practice it has been found suitable to employ aluminum foil sheet material of 0.0035 inches for the outer part 11, and aluminum foil sheet material of between 0.001 and 0.002 inches for the inner part.

The outer part 11 may be a generally upwardly opening tray or container including a generally flat lower or bottom wall 15, and a peripheral side wall 16 upstanding from and extending circumferentially about the bottom wall. In the illustrated embodiment the tray-like container or outer part 11 is of a generally rectangular outline configuration, but may be otherwise, as will appear more fully hereinafter. Advantageously the rectangular configuration of outer part side wall 16 is formed with arcuate or rounded corners 17, and the side wall may terminate at its upper end in a reinforcing bead, as at 18, if desired. Also, if desired, the bottom wall 15 may be perforated, as to facilitate baking or heat transmission.

The inner part 12 is formed of a plurality of upwardly opening receptacles or cups 20 which, in the illustrated embodiment, are located in a generally rectangular array, shown for purposes of illustration as being 12 in number and arranged with three receptacles along the ends of the array and four receptacles along the sides of the array. Further, the array of receptacles 20 is generally congruent to the outer part 11 for conforming engagement therein, as will appear more fully hereinafter.

The receptacles 20 may each include a bottom wall 21 and a side wall 22, the bottom walls being generally circular in the illustrated embodiment, and the side walls 22 being generally cylindrical or frusto-conical and flaring upwardly. The receptacle side walls 22 and all of approximately equal height, which height is less than that of the peripheral side wall 16 of the outer part 11.

The several receptacles or cups 20 are interconnected by an integral web or sheet 23 extending between the upper edges of adjacent receptacles. Thus, the sheet web 23 may be considered as connecting together all of the receptacles 20; or conversely, the several receptacles 20 may be considered as depressed from the material of web 23. As the receptacles 20 and web 23 are integrally fabricated of a single sheet of foil, the receptacles may be relatively close to each other, as compared to the multipart formation of conventional muffin pans, to effect considerable savings in space.

Extending about the bounding sides and ends of the inner part 12 are a plurality of web extensions 24. That is, the web extensions 24 upstand from the plane of the web 23 and the upper edges of the receptacles 20 for securement to the upper edge 18 of the outer part side wall.

In assembled condition, as seen in FIGS. 1 and 3, it will there be observed that the receptacles 20 have their bottom wall 21 resting on the bottom wall 15 of the outer part 11. Further, the outermost extremities of the receptacle side walls 22 are disposed against and in engagement with the peripheral side wall 61 of the outer part 11. If desired, the arcuate or rounded corners 17 of the outer part side wall 16 may be of a curvature approximating that of the receptacle side walls 22, for conforming reception of the adjacent corner receptacle.

Further, as best seen in FIG. 3, the web extensions 24 upstand along the outer part side wall 16 and have their marginal regions 25 configured in securing engagement with the upper edge region 18 of the outer part side wall 16. More specifically, as seen in FIG. 3, the marginal edge region 25 of web extension 24 is folded in conforming engagement about the edge bead formation 18 of the side wall 16. Thus, the interfitting marginal edge formations 25 and 18 combine to effectively secure the outer and inner parts in their assembled relationship.

Also shown in FIGS. 1 and 3 are muffins or rolls 30 located in respective receptacles 20, projecting slightly thereabove and terminating below the upper plane of the utensil 10. Further, an overwrap 31, say a heat-shrink plastic, is shown wrapped about the utensil 10 and its contents 30. The overwrap is preferably transparent to expose the contents and protect the same from contamination, while being spaced thereabove.

While the baking utensil 10 of the illustrated embodiment is rectangular, it is appreciated that the utensil may be of other desired configuration, say circular, wherein the outer part side wall 16 would be circular and the array of receptacles 20 would be circular. Also, it should be noted that the relative thicknesses of sheet material of the outer part 11 and inner part 12, as shown in section in FIG. 3 are exaggerated, the outer part thickness may range from approximately 0.003 inches to 0.004 inches, depending upon size, shape, cost and service requirements.

From the foregoing, it is seen that the present invention provides a baking utensil which effects substantial savings in packaging operations, space and cost, permits of automating certain other operations, effectively protects the fragile contents thereof until the point of ultimate consumption, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A baking utensil comprising a hollow upwardly opening outer part fabricated of a single sheet of metal including a generally flat bottom wall and upstanding peripheral side wall, and an inner part fabricated of a single sheet of metal and disposed in said outer part, the metal sheet of said outer part being of heavier gauge that the metal sheet of said inner part, said inner part comprising a plurality of hollow upwardly opening receptacles disposed in side-by-side relation with each other and each having a generally flat receptacle bottom resting on the outer part bottom wall, a web extending between the upper regions of adjacent receptacles, web extensions extending to the peripheral side wall of said outer part, and securing means securing said web extensions to said outer part peripheral side wall, said inner and outer parts effectively reinforcing and rigidifying each other by the multiple flat surface area engagement therebetween and the peripheral securement together of the inner and outer parts, said receptacles terminating at their upper edges below the upper edges of said outer part side wall, said web lying in a plane spaced below the plane of said outer part side wall upper edges, and said web extensions lying against said outer part peripheral side wall, whereby contents of said receptacles cresting above the latter but not above said outer part side wall facilitate overwrapping without contacting the contents.

2. A baking utensil according to claim 1, said securing means comprising interfitting marginal edge portions of said web extensions and said outer part side wall.

3. A baking utensil according to claim 1, said outer part sheet being of a thickness approximately equal to or greater than 0.003 inches, and said inner part sheet being of a thickness approximately equal to or less than 0.002 inches, whereby the outer part is sufficiently sturdy to afford protection in handling and the inner part is sufficiently light in weight to effect substantial economies in material.

4. A baking utensil according to claim 1, said receptacles being located in an array conformably received in said outer part.

5. A baking utensil according to claim 4, the outer side extremities of said receptacles engaging the sides of said outer part.

6. A baking utensil according to claim 5, said outer part and said array of receptacles being generally rectangular, and said outer part having rounded corners conformably receiving respective receptacles of said inner part.

* * * * *